(12) United States Patent
Grosso et al.

(10) Patent No.: US 6,868,208 B2
(45) Date of Patent: Mar. 15, 2005

(54) APODIZATION METHOD FOR A BRAGG GRATING

(75) Inventors: Philippe Grosso, Lannion (FR); David Mechin, Chalmazel (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/363,570

(22) PCT Filed: Aug. 29, 2001

(86) PCT No.: PCT/FR01/02691

§ 371 (c)(1),
(2), (4) Date: Oct. 21, 2003

(87) PCT Pub. No.: WO02/18996

PCT Pub. Date: Mar. 7, 2002

(65) Prior Publication Data

US 2004/0096156 A1 May 20, 2004

(30) Foreign Application Priority Data

Aug. 30, 2000 (FR) .................................... 00 11066

(51) Int. Cl.$^7$ ................................................ G02B 6/34
(52) U.S. Cl. ............................. 385/37; 385/10; 65/392
(58) Field of Search ................................ 359/563, 568, 359/569, 572; 385/10, 37; 65/385, 392

(56) References Cited

U.S. PATENT DOCUMENTS

| | | | |
|---|---|---|---|
| 5,629,998 A | * | 5/1997 | Cook et al. .................... 385/37 |
| 5,708,738 A | | 1/1998 | Perez et al. |
| 6,043,497 A | | 3/2000 | Quetel et al. |
| 6,574,395 B1 | * | 6/2003 | Mechin et al. ................. 385/37 |

FOREIGN PATENT DOCUMENTS

| | | |
|---|---|---|
| EP | 0884611 A2 | 12/1998 |
| EP | 0884612 A2 | 12/1998 |
| EP | 0949518 A2 | 10/1999 |
| FR | 2778750 | 11/1999 |

OTHER PUBLICATIONS

"Apodised in–fibre Bragg grating reflectors photoimprinted using a phase mask", Electronics Letters, Feb. 2, 1995, vol. 31, No. 3, p. 223–224.

\* cited by examiner

*Primary Examiner*—Akm Enayet Ullah
*Assistant Examiner*—Omar Rojas
(74) *Attorney, Agent, or Firm*—Blakely Sokoloff Taylor & Zafman (57) ABSTRACT

The invention provides a method of photoinducing a Bragg grating in an optical fiber (300) or a waveguide, in which a selected zone of the fiber (300) or waveguide is subjected to a step of being exposed with a source beam (120) using a mirror (200) in such a manner as to fold a portion (122) of the source beam (120) as reflected by the mirror (200) onto a portion (224) of the source beam that is not reflected by the mirror, thereby obtaining a diffraction grating in the fiber (300) or waveguide, the method being characterized in that an additional exposure step is performed on said portion of the fiber (300) or waveguide, and in that relative displacement is imparted between the two exposure steps to elements selected from the beam (120), the fiber (300) or waveguide, and the mirror (200) in such a manner as to cause a same portion of the beam (120) used for photoinduction in both exposure steps to be reflected by the mirror (200) in one of the steps and not reflected by the mirror (200) in the other step.

10 Claims, 6 Drawing Sheets

FIG_1

FIG_2

FIG_3

FIG_4

FIG_5                FIG_6

FIG_7 (Prior Art)

FIG_8

FIG_9

FIG_10

FIG_11

FIG_12

FIG_13

FIG_14

APODIZATION METHOD FOR A BRAGG GRATING

The present patent application is a non-provisional application of International Application No. PCT/FR01/02691, filed Aug. 29, 2001.

BACKGROUND OF THE INVENTION

1. Field of the Invention

The invention relates to photoinducing patterns in an optical fiber or waveguide, e.g. for the purpose of making passive optical components for wavelength division multiplexed (WDM) networks, and also for dense WDM (DWDM) networks.

The invention relates more particularly to apodizing a Bragg grating made using a Lloyd mirror.

A Bragg grating presents a refractive index that varies in alternating manner along the grating. This variation can be defined by the way the mean index varies along the grating and by the envelope of the curve representing index variations (the "index modulation envelope").

2. Description of Related Art

It is known that the spectral response of a Bragg grating is the Fourier transform of said envelope.

Figure 1:
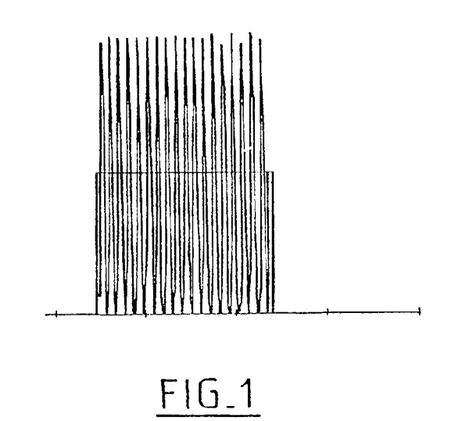
FIG. 1 is a graph showing uniform index distribution in a Bragg grating.
Figure 2:
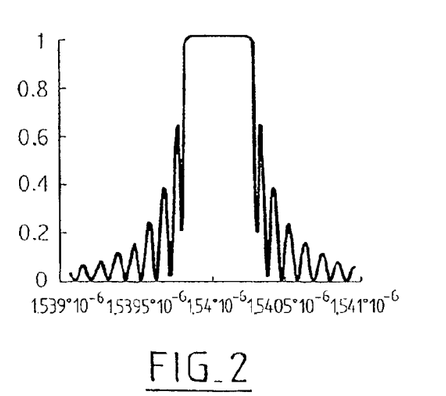
FIG. 2 is a graph showing the spectral response of a filter having the index distribution of FIG. 1.

If the envelope is uniform, as shown in FIG. 1, the spectral response is a cardinal sine as shown in FIG. 2. Such a cardinal sine turns out to be unusable as a filter since it is poorly selective in wavelength because of its side lobes.

Figure 3:
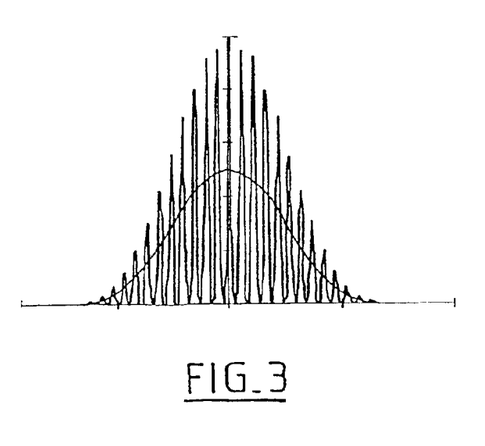
FIG. 3 is a graph showing an index distribution of the type having an envelope and a mean index that are both Gaussian.
Figure 4:
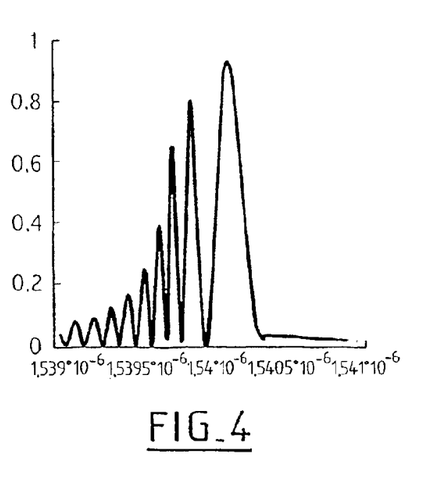
FIG. 4 is a graph showing a spectral response of a filter having the index distribution of FIG. 3.

If the modulated envelope of the grating has a Gaussian distribution with a mean index that also has a Gaussian distribution, as shown in FIG. 3, then the spectral response is Gaussian as shown in FIG. 4. Nevertheless, the Gaussian mean index creates a Fabry-Perot interferometer which disturbs the spectral response.

Figure 5:
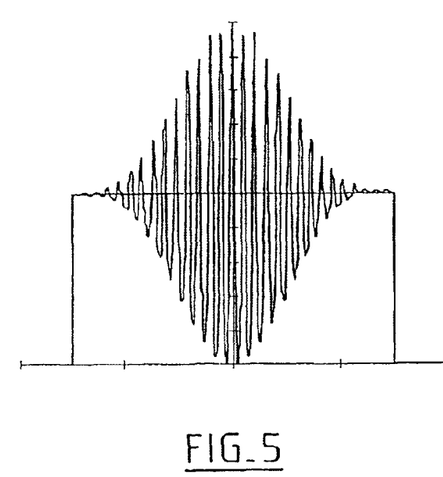
FIG. 5 is a graph showing an index distribution of the type having constant mean index and Gaussian modulation envelope.
Figure 6:
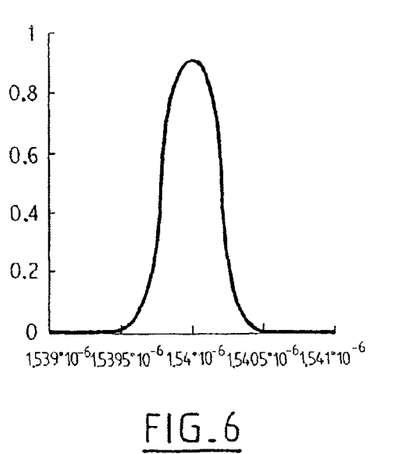
FIG. 6 is a graph showing the spectral response of a filter having the index distribution of FIG. 5.

The index distribution which is considered as being ideal is a modulation envelope of Gaussian type distribution with a mean index that is constant as shown in FIG. 5. Such an index distribution gives a Gaussian spectral response as shown in FIG. 6.

Figure 7:
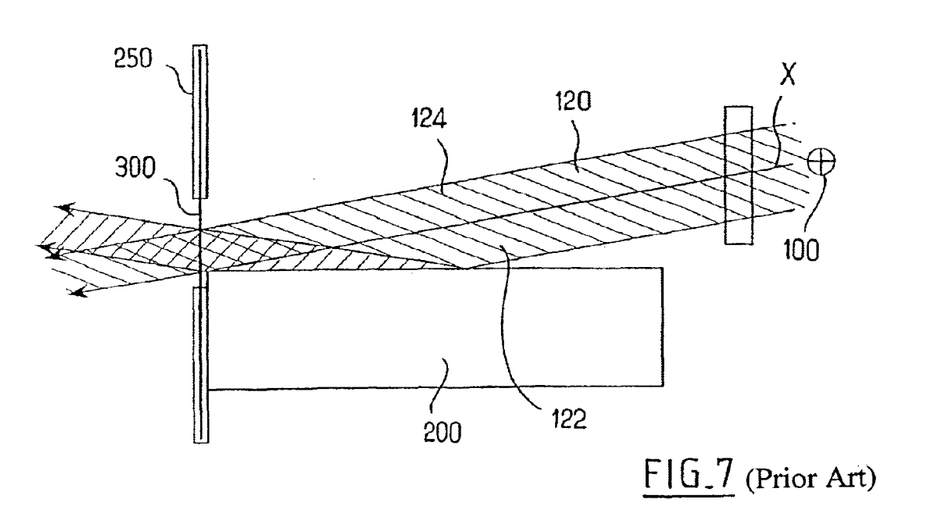
FIG. 7 shows a prior art interferometer setup with wave front separation.

Photoinducing by means of a Lloyd mirror, i.e. interferometric photoinduction with wave front separation, is performed in known manner by means of a setup as shown in FIG. 7, the setup comprising a polarized laser source 100 which generates a beam 120 impinging obliquely on a Lloyd mirror 200 placed perpendicularly to and in the immediate vicinity of the fiber 300 in which photoinduction is to take place. The laser beam 120 presents a transverse intensity distribution that is substantially Gaussian, with its maximum lying on a central axis X of the beam.

The fiber 300 is mounted on a support 250 positioned relative to the Lloyd mirror 200 in such a manner that the central axis X of the laser beam 120 reaches the end of the mirror 200 that is adjacent to the fiber 300.

The beam 120 thus presents a bottom half 122 situated beneath its axis X in which light rays are reflected by the mirror 200, and a top half 124 situated above the axis X in which light rays are transmitted directly to the fiber 300 without being reflected.

The reflected portion 122 is superposed on the transmitted portion 124 so that the fiber 300 is illuminated by a folded beam, and thus by a diffracted light grating. The mean intensity in said grating tapers off going away from the central axis X of the laser beam 120.

Figure 8:
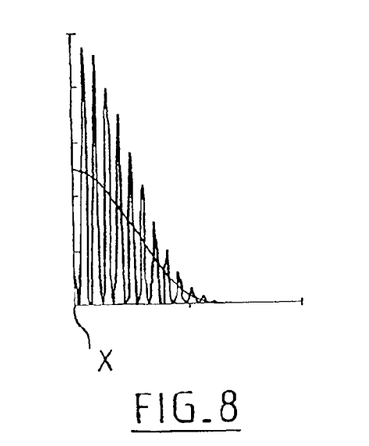
FIG. 8 is a graph showing the index distribution obtained in a fiber photoinduced using the setup of FIG. 7.

This produces a mean intensity in the grating which varies in compliance with a half-Gaussian curve as shown in FIG. 8, with the maximum of the half-Gaussian lying on the central axis X of the beam 120, and with the attenuated edge of the half-Gaussian lying in the margins of the laser beam 120 that have been folded onto each other.

The index distribution that is obtained presents an average that varies along the fiber 300 in Gaussian manner and there is no Fabry-Perot interferometer in its spectral response, i.e. there are no oscillations since there is an index discontinuity in the center of the grating.

The modulated envelope of the index is likewise a half-Gaussian with its apex corresponding to the location along the fiber 300 where it comes flush with the mirror 200.

Nevertheless, the semi-Gaussian distribution of the mean index creates a pitch that varies from the center to the edge of the grating, which is known as "chirp". This chirp is to be found in the spectral response where it has a value corresponding substantially to a pitch difference of $\pi n$ of such a chirped index distribution.

The reflected frequency peak is broadened by the value of the chirp.

For applications which require the grating to reflect a very fine frequency peak (in particular for DWDM applications), this index distribution turns out to be insufficient.

BRIEF SUMMARY OF THE INVENTION

More generally, it is desirable to implement apodization of Bragg gratings made by means of a Lloyd mirror so as to achieve a spectral response that is more accurate while remaining easy to make.

According to the invention, this object is achieved by a method of photoinducing a Bragg grating in an optical fiber or a waveguide, in which a selected zone of the fiber or waveguide is subjected to a step of being exposed with a source beam using a mirror in such a manner as to fold a portion of the source beam as reflected by the mirror onto a non-reflected portion of the source beam, thereby obtaining a diffraction grating in the fiber or waveguide, the method being characterized in that an additional exposure step is performed on said portion of the fiber or waveguide, and in that relative displacement is imparted between the two exposure steps to elements selected from the beam, the fiber or wave-guide, and the mirror, in such a manner as to cause a same portion of the beam used for photoinduction in both exposure steps to be reflected by the mirror in one of the steps and not reflected by the mirror in the other step.

The invention also provides a method of photoinducing a Bragg grating in an optical fiber or a waveguide, in which a selected zone of the fiber or wave-guide is subjected to a step of being exposed with a source beam using a mirror in such a manner as to fold a portion of the source beam as reflected by the mirror onto a portion of the source beam that is not reflected by the mirror, thereby obtaining a diffraction grating in the fiber or waveguide, the method being characterized in that an additional exposure step is performed on said portion of the fiber or waveguide, and in that relative displacement is imparted between the two exposure steps to elements selected from the beam, the fiber or wave-guide, and the mirror, in such a manner as to cause a same portion of the beam used for photoinduction in both exposure steps to be reflected by the mirror in one of the steps and not reflected by the mirror in the other step.

BRIEF DESCRIPTION OF THE DRAWINGS

Other objects, characteristics, and advantages of the invention appear on reading the following detailed description made with reference to the accompanying figures, in which.

DETAILED DESCRIPTION OF THE INVENTION

In the embodiment of the invention described below, the interferometer setup used still presents a source 100, a mirror 200, and a support 250 for the fiber 300.

It further comprises two masking screens 400 and 450 placed so as to limit the transverse extent of the laser beam 120.

The masks 400 and 450 are preferably placed beside a cylindrical focusing lens (apodizing lens) 470 placed immediately upstream of the Lloyd mirror 200.

Figure 9:
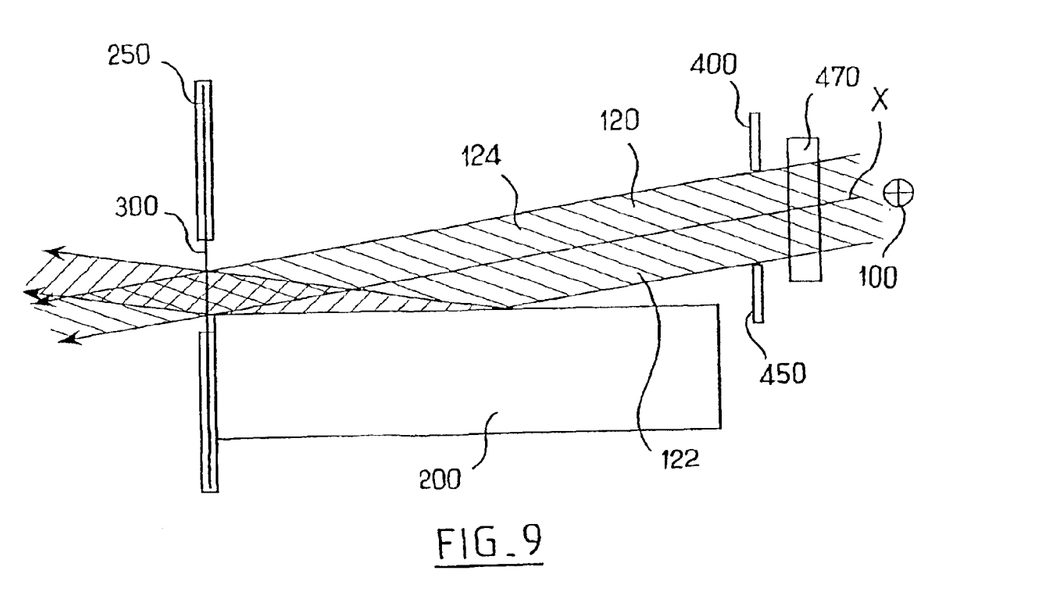
FIG. 9 shows an interferometer setup of the invention during a first photoinduction step.

In a first exposure step shown in FIG. 9, the top and bottom masks 400 and 450 are placed substantially symmetrically to each other about the central axis X of the laser beam 120. Each of them is spaced apart from the axis X by a distance 1.085 w where w is the distance to the axis x where, compared with the maximum intensity on the axis X, the intensity of the laser light presents a value which is smaller by a ratio $1/e^2$.

This distance w, and thus the selected length 1.085 w, naturally depends on the intensity distribution within the beam 120.

The laser beam typically presents an intensity distribution that is Gaussian and that can be written in the following form:

$$I_{mod}(r) = \exp(-2r^2/w^2)$$

(normalized with I0=1 and $w_{1/e}{}^2=1$), where r is the transverse distance from the axis X.

This first exposure step corresponds to conventional photoinduction as described above with reference to FIG. 7, with the addition of the above-specified selected transverse limitation.

The index distribution in the waveguide 300 after this exposure step is substantially the same as that shown in FIG. 8 as described above, with, in addition, a limitation in length to 1.085 w. The resulting index distribution is shown more precisely in FIG. 10.

Figure 10:
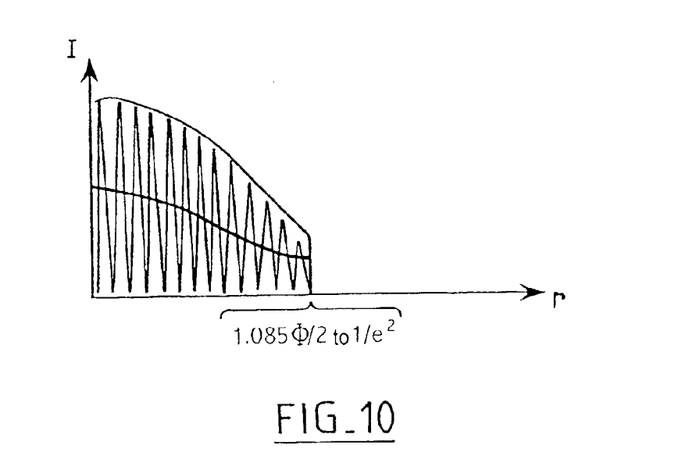
FIG. 10 shows an index distribution obtained in the fiber after said first photoinduction step.

Since the mean index is of Gaussian distribution, this means that in this case also the grating presents chirp after this step, and thus that the peak as reflected by the filter is broadened by the value that corresponds to the chirp.

Figure 11:
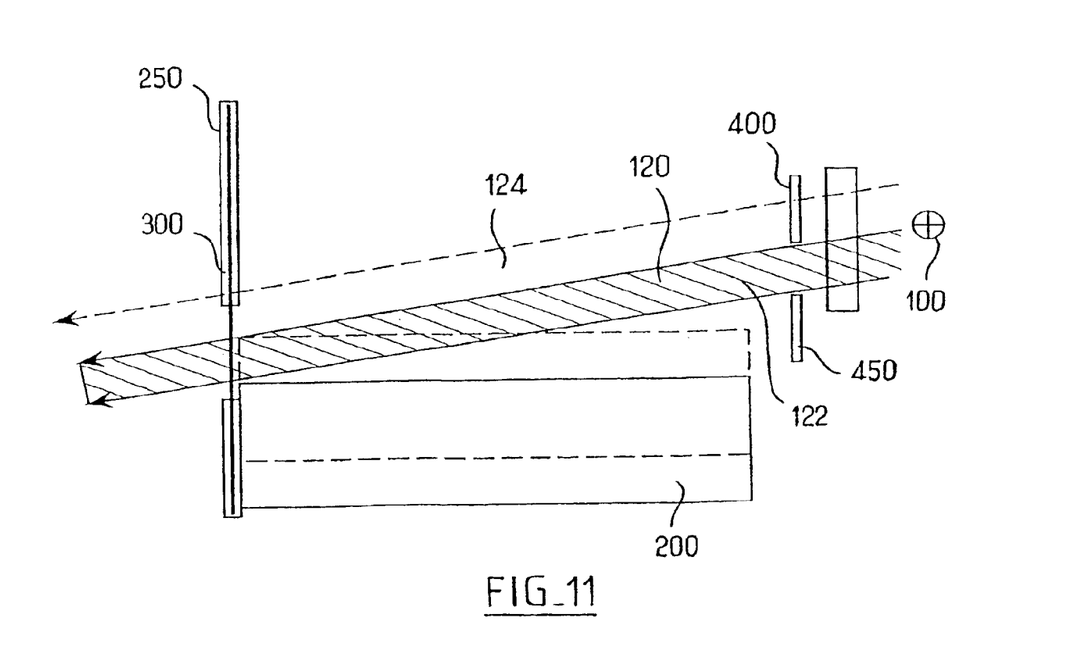
FIG. 11 shows an interferometer setup of the invention during a second photoinduction step.
Figure 12:
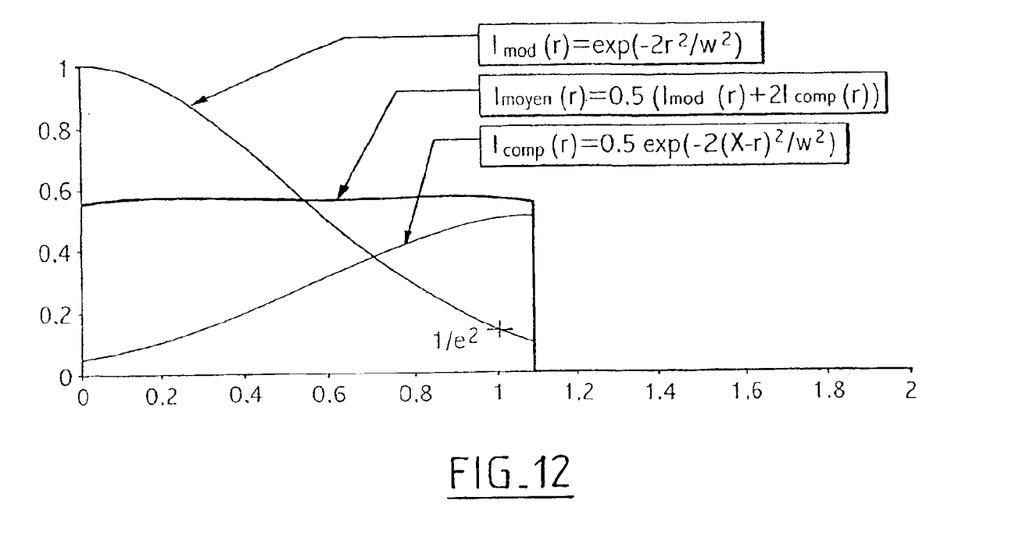
FIG. 12 shows the mean intensity distributions applied to the fiber during the first and second steps, and a resultant of said two mean intensities.

In a second exposure step, the Lloyd mirror 200 is moved laterally away from the laser beam 120, as shown in FIG. 11, such that the bottom half 122 of the beam which was initially reflected is now transmitted directly onto the fiber 300.

In addition, the support 250 and the fiber 300 are displaced in such a manner that the portion of the fiber 300 which was exposed during the preceding step is now placed in the bottom half 122 of the laser beam 120, i.e. the half of the beam which was previously reflected and which is now transmitted directly to the fiber 300.

Thus, by appropriate support means enabling such displacement, the Lloyd mirror 200 and the fiber 300 on its support 250 are moved in translation towards the flank of the initially reflected Gaussian.

Thus, this portion of the fiber 300 is now exposed with an intensity distribution that increases in the direction opposite to the direction of the increase presented in the preceding exposure.

Since this second exposure is performed without diffraction, it adds to the index distribution of FIG. 8 a continuous intensity shift which in this case has the form of a reverse semi-Gaussian.

The intensity peak is no longer located at the bottom of the exposed zone, but at the top, and it tapers going downwards and not going upwards.

The relative offset between the fiber 300/source 100/ mirror 200 thus gives rise to a simple permutation of two mean index distributions in the exposed portion of the fiber. The bottom portion 122 of the beam 120 is merely reversed, and the top portion 124 disappears.

In addition, in order to avoid exposing portions of the fiber 300 other than those which it is desired to expose, the top mask 400 is shifted in such a manner as to cut off the top half of the laser beam.

These two exposure steps thus seek to obtain a mean index in the exposed portion which is as constant as possible.

To obtain a distribution that is as constant as possible, it is desirable during this second exposure stage to adopt a relative offset D between the fiber 300 and the beam 120 that lies in the range w to 1.1 w, and which is ideally 1.085 w. The distribution of the laser mode written as the $TEM_{00}$ mode is given by the following formula:

$$I_{mod}(r) = \exp(-2r^2/w^2)$$

(normalized to I0=1 and $w_{1/e}{}^2=1$).

The half-Gaussian shifted through the distance D for mean index compensation is expressed as follows:

$$I_{comp}(r) = 0.5\exp(-2(D-r)^2/w^2)$$

As shown in FIG. 10, the mean intensity obtained after the two exposure steps is expressed as follows:

$$I_{mean}(r) = 0.5 I_{mod}(r) + 2 I_{comp}(r)$$

The value of D for which $I_{mean}(r)$ is as constant as possible turns out with such an intensity distribution relationship to be 1.085 w. To determine this optimum value for D, a search is made for the smallest standard deviation of $I_{mean}$.

Preferably, as mentioned above, and without this being absolutely essential, the masks 400 and 450 are placed in such a manner that during the two steps, the beam is limited to a transverse extent that is equal to 1.085 w so that with such translation through the selected offset of 1.085 w, the extent of the light is identical in both steps.

Such an apodization method is easy to implement, particularly if both steps are performed continuously, one after the other, photoinduction being performed with the same positioning reference marks and with the same visual inspection means.

Figure 13:
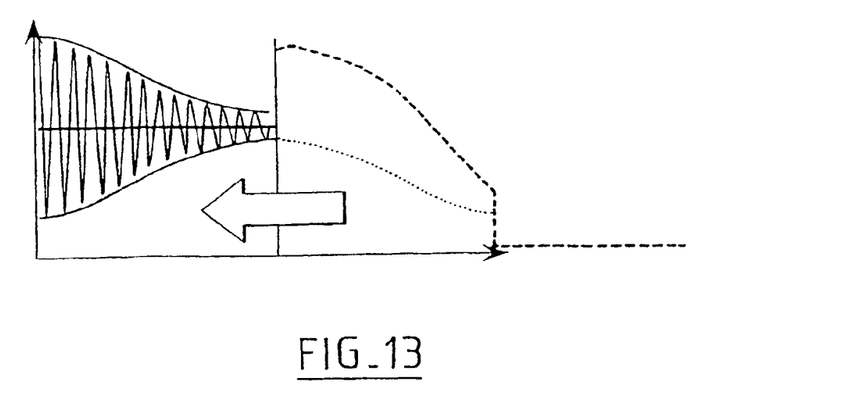
FIG. 13 shows the index distribution in the fiber after the two photoinduction steps of FIGS. 9 and 11.

FIG. 13 shows the refractive index distribution after both exposure steps. In FIG. 13, the left-hand side shows the modulation envelope and the mean index distribution after the two exposure stages. The right-hand side shows the modulation envelope after the first step and prior to the second step. To clarify the figure, this modulation envelope is placed at the location where the exposed portion was located prior to translation, and an arrow represents the translation shift to which the fiber 300 is subjected.

Figure 14:
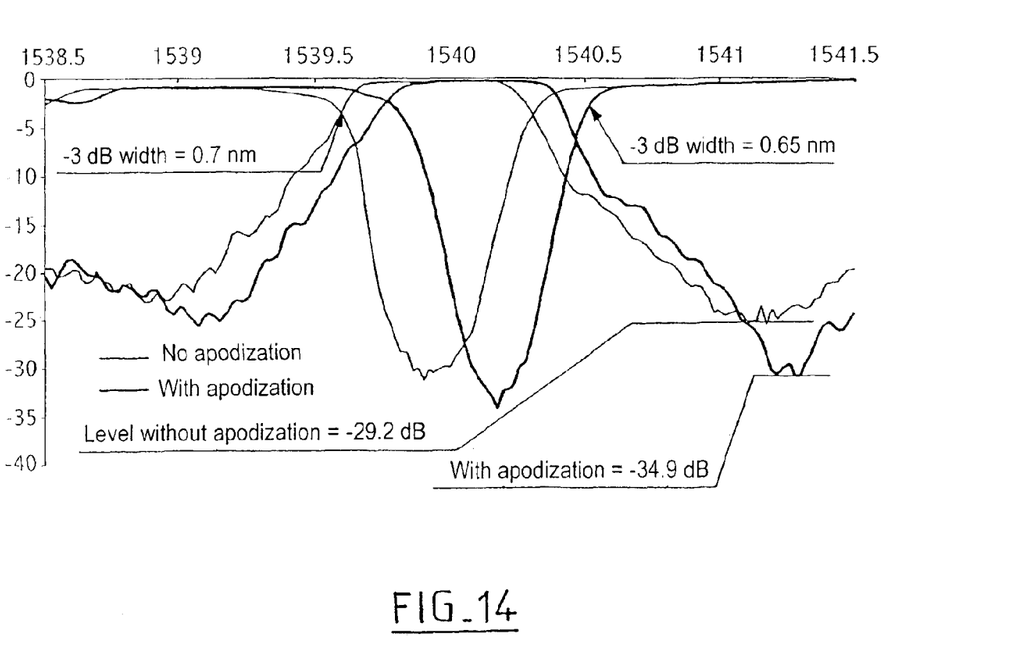
FIG. 14 shows the spectral responses of two gratings, one photoinduced by a method of the invention, and the other photoinduced by a prior art method.

As shown in FIG. 14, after apodization on a short grating (6 millimeters (mm) long), the result is particularly satisfactory since the width of the reflection peak decreases from 0.7 nanometers (nm) to 0.65 nm, while its amplitude increases from 30 decibels (dB) to 35 dB. This produces a wavelength filter that is particularly advantageous.

What is claimed is:

1. A method of photoinducing a Bragg grating in an optical fiber (300) or a waveguide, in which a selected zone of the fiber (300) or waveguide is subjected to a step of being exposed with a source beam (120) using a mirror (200) in such a manner as to fold a portion (122) of the source beam (120) as reflected by the mirror (200) onto a portion (124) of the source beam that is not reflected by the mirror, thereby obtaining a diffraction grating in the fiber (300) or waveguide, the method being characterized in that an additional exposure step is performed on said portion of the fiber (300) or waveguide, and in that relative displacement is imparted between the two exposure steps to elements selected from the beam (120), the fiber (300) or waveguide, and the mirror (200), in such a manner as to cause a same portion of the beam (120) used for photoinduction in both exposure steps to be reflected by the mirror (200) in one of the steps and not reflected by the mirror (200) in the other step.

2. A method according to claim 1, characterized in that the source beam (120) is such that the resulting diffraction grating presents a mean light intensity ($I_{mod}$) that decreases towards one of the margins of the diffracted grating, and in that the additional exposure step is performed with light distribution that presents mean light intensity ($I_{comp}$) that decreases in a direction that is opposite to the direction of the decrease in mean intensity ($I_{mod}$) present during exposure with the diffraction grating.

3. A method according to claim 1 or claim 2, characterized in that the additional exposure step is performed by using, without reflection, a portion of the beam (120) that is reflected (122) during said folded exposure step.

4. A method according to claim 1, characterized in that the mean transverse distribution of intensity in the beam during folded exposure ($I_{mod}$) can be written as follows:

$$A\exp\left(-\frac{2r^2}{w^2}\right)$$

where I is the transverse distance to a main axis (x) of the source beam and where $\underline{w}$ and A are constants, and in which during said additional exposure, exposure is performed with a mean transverse distribution of intensity ($I_{comp}$) in the beam (120) that can be written as follows:

$$A\exp\left(-\frac{2(D-R)^2}{w^2}\right)$$

where D is selected to lie in the range $\underline{w}$ to 1.1 w.

5. A method according to claim 4, characterized in that D is selected to be equal to 1.085 w.

6. A method according to claim 1, characterized in that lateral masks are used to define the borders of the source beam, and in that the lateral masks (400, 450) are moved between the two exposures so as to hide, in one of said exposures, a portion of the beam (120) which is used for photoinduction during the other exposure.

7. A method according to claim 1, characterized in that the beam (120) is limited in both exposures to a width such that it presents a minimum intensity margin of intensity whose ratio relative to the maximum intensity in the beam (120) is $1/e^2$.

8. A method according to claim 1, characterized in that the source beam (120) presents a mean intensity distribution of Gaussian type, in that the folded exposure step is performed by placing the mirror (200) in such a manner that it is adjacent to the fiber (300) or waveguide at a point where it intersects an axis (X) of maximum intensity in the beam (120) so that the fiber (300) or waveguide is exposed by a mean light intensity ($I_{mod}$) of semi-Gaussian distribution with the intensity maximum being situated substantially at the point where the mirror (200) intersects the axis (X) of the beam (120), and in that the additional exposure step is performed by placing the mirror (200) so as to be offset out from the beam (120) in such a manner as to avoid interfering therewith, the fiber (300) or waveguide being offset so that the zone of the fiber (300) or the waveguide which is exposed lies in the portion of the beam (120) that corresponds to the portion (122) that is reflected during the folded exposure step.

9. Apparatus for photoinducing an optical fiber (300) or waveguide the apparatus comprising a light source (100) suitable for producing a source beam (120), a mirror (200), and means (250) for holding the fiber (300) or waveguide, said elements being designed to be placed in a first disposition in which a diffraction type beam (120) as folded by the mirror (200) is obtained on the fiber (300) or waveguide downstream from the mirror (200) which apparatus is characterized in that it further comprises means for allowing relative displacements between elements selected from the source (100), the mirror (200), and the means (250) for holding the fiber (300) or waveguide to enable them to occupy a second disposition for exposure of said portion of the fiber (300) or waveguide, and in that said means allow displacements which are such that a portion (122) of the source beam (120) reaching the fiber (300) or waveguide in both dispositions is reflected in one of said dispositions and is not reflected in the other.

10. Apparatus according to claim 9, characterized in that the relative displacement means are constituted by means for displacing the fiber (300) or waveguide and the mirror (200) laterally away from the beam (120).

* * * * *

UNITED STATES PATENT AND TRADEMARK OFFICE
CERTIFICATE OF CORRECTION

PATENT NO. : 6,868,208 B2
DATED : March 15, 2005
INVENTOR(S) : Grosso et al.

It is certified that error appears in the above-identified patent and that said Letters Patent is hereby corrected as shown below:

Column 6,
Line 1, please delete "where I is" and insert -- where r is --.

Signed and Sealed this

Sixteenth Day of August, 2005

JON W. DUDAS
*Director of the United States Patent and Trademark Office*